United States Patent [19]

Peters et al.

[11] 4,223,202
[45] Sep. 16, 1980

[54] APPARATUS AND METHOD FOR WELDING BOAT SUBASSEMBLIES UTILIZING LASER RADIATION

[75] Inventors: George T. Peters, Farmington; Conrad M. Banas, Bolton, both of Conn.

[73] Assignee: United Technologies Corporation, Hartford, Conn.

[21] Appl. No.: 969,598

[22] Filed: Dec. 14, 1978

[51] Int. Cl.³ .............................................. B23K 27/00
[52] U.S. Cl. ........................ 219/121 L; 219/121 LM; 219/158
[58] Field of Search ...... 219/121 L, 121 LM, 121 EB, 219/121 EM, 158, 161, 162, 124.1, 125.1, 125.11, 137 R; 228/29, 44.1 R

[56] References Cited

U.S. PATENT DOCUMENTS

| | | | |
|---|---|---|---|
| 2,153,785 | 4/1939 | Williams | 219/125.11 |
| 2,618,727 | 11/1952 | Osborne | 219/126 |
| 2,794,901 | 6/1957 | Christensen et al. | 219/126 |
| 3,146,162 | 3/1979 | Skakunov | 219/125.1 X |
| 3,414,950 | 12/1968 | Phariss | 219/161 X |
| 4,088,865 | 5/1978 | Peters | 219/121 L |
| 4,132,338 | 1/1979 | Bove et al. | 228/29 |

*Primary Examiner*—C. L. Albritton
*Attorney, Agent, or Firm*—Lawrence A. Cavanaugh

[57] ABSTRACT

An apparatus for welding T-frame stiffeners circumferentially to the interior surface of a cylindrical shell at selected axial positions to fabricate reinforced hull sections suitable for boat construction is disclosed. The apparatus is adapted for providing simultaneous two-sided Tee welds of the T-frame to the shell using radiation from a laser source to form quickly the welds which significantly reduces the time and costs of fabricating hull subassemblies.

15 Claims, 2 Drawing Figures

APPARATUS AND METHOD FOR WELDING BOAT SUBASSEMBLIES UTILIZING LASER RADIATION

BACKGROUND OF THE INVENTION

The present invention relates to an apparatus for automating the construction of boats and more particularly to an apparatus for fabricating hull sections suitable for the construction of submarines utilizing automated laser welding equipment.

Since the early 1970's a considerable effort has been made by the boat building industry to improve productivity and reduce boat construction costs. A large part of this effort has been directed to the introduction into the boatyards of automated equipment and highly mechanized assembly line production systems where emphasis has been directed to precutting components, fabricating large subassemblies from the components and constructing the boat with the subassemblies using modular techniques.

In the construction of submarine hulls, high strength alloy steel plates are preassembled in sections and welded together forming the exterior shell of a hull subassembly. Circular T-frames are welded to the interior surface of the shell providing circular reinforcement of the shell to form the hull subsection. The welding of the T-frame to the shell is typically performed in a boatyard using a mechanized gas metal arc process. An essential requirement of this process is the preheating of the areas of be joined which is typically performed in the boatyard with thermostatically controlled electric strip heaters. The surface temperature of both the T-frame and the shell must be monitored during the operation to ensure that it is within the required range to obtain adequate welds, typically ninety to one hundred fifty degrees Celsius. This is a time consuming and costly portion of the boatyard welding process.

Additionally during the welding process many passes of the arc welder over the junction of the T-frame and the shell are required to obtain full penetration therein to form an acceptable weld. After each pass surface oxide, formed during the pass, must be removed from the weld area to avoid contaminating the weld during subsequent passes. Moreover, after a weld has been obtained on one side of the junction of the T-frame with a shell, the hull subsection must be inverted to form a weld on the other side of the junction since acceptable welds are typically obtained only when the welding is performed in a downhand direction. Because of the exceptional quality of the weld which must be obtained for submarine construction, the welding of T-frame supports to the interior surface of the shell to form hull subassemblies utilizing a metal arc welding process is a very time consuming and expensive process.

SUMMARY OF THE INVENTION

A primary object of the present invention is to increase the productivity and reduce the costs of fabricating hull sections for submarines.

In accordance with the present invention an apparatus for fabricating reinforced hull sections suitable for boat construction comprises, a support structure adapted for circumferentially enclosing a shell subassembly for constraining motion of the shell subassembly in the radial direction, actuator means attached to the support structure adapted for pressing radially against an exterior surface of the shell subassembly for rigidly maintaining the shell subassembly during a welding operation, interior ram means adapted for pressing in the radial direction T-frames disposed circumferentially about an interior surface of the shell subassembly at a preselected axial position forming a junction between the T-frame and the interior surface of the shell suitable for welding and for maintaining the circumferential axial position of the T-frame during welding, means for focussing high power laser radiation onto the junction of the T-frame with the interior surface of the shell for welding the T-frame to the shell; means for rotating the means for focusing high power laser radiation about a longitudinal axis of the shell subassembly for circumferentially welding the T-frames to the shell; means for axially positioning the interior ram means and the means for focussing high power laser radiation at selected positions along the longitudinal axis within the shell subassembly; and means for directing radiation from a laser to the means for focussing high power laser radiation onto the junction for Tee welding the T-frame to the shell to form a hull section.

A primary feature of the present invention is a pair of welding heads disposed on opposite sides of the T-frame, adapted for Tee welding the T-frame to the shell. Additionally, each welding head is attached to one end of a telescopic arm adapted for positioning the welding heads for focussing radiation onto the junction of the T-frame and the shell for passing the radiation to the welding heads. The other end of each of the telescopic arms is attached to a housing adapted for rotation about a longitudinal axis through the shell subassembly. Also a plurality of ram arms, radially disposed about the housing and movably connected thereto at one end are adapted for pressing the T-frames to the surface of the shell. Additionally, a shaft centrally disposed within the shell symmetrically about the longitudinal axis is adapted for rotating the housing about the longitudinal axis and for moving the housing axially along the longitudinal axis. Also deflection mirrors disposed within the shaft are adapted for deflecting a portion of a beam of radiation from a laser to the welding heads.

In one embodiment the support structure is a plurality of massive columns disposed in a spaced apart relationship. In a still further embodiment the columns are positioned on tracks adapted for moving the columns in a radial direction for accommodating shell subassemblies of various diameters and curvilinear configurations. Additionally a portion of the columns are adapted for being ratractable for providing an opening in the support structure capable of passing the shell subassembly.

The primary advantage of the present invention is the high speed of the simultaneous two-sided Tee welding of the T-frames to the shell section to form hull sections. Additionally, the simultaneous two-sided welding eliminates the need for inverting the shell to complete the welding operation and minimizes thermal distortion of the welded sections. Additionally the utilization of laser welding permits the use of simple square edge geometries as opposed to the V-shaped edges utilized in conventional welding joints thus reducing joint preparation requirements significantly. The hydraulic rams are adapted for responding to programmed instructions and automatically mount, position and clamp the T-frames to the inside surface of the shell thus substantially improving productivity and reducing elapsed time. Additionally high speed, two-sided laser welding eliminates the requirement of maintaining the shell subassembly and the T-frame at a particular preheat temperature for extended periods greatly reducing heating energy requirements. The combined effect of the foregoing features is a substantial reduction in time and cost compared to prior art procedures.

The foregoing and other objects, features and advantages of the present invention will become more apparent in the light of the following detailed description of the preferred embodiments thereof as discussed and illustrated in the accompanying drawing.

DESCRIPTION OF THE PREFERRED EMBODIMENT

Figure 1:
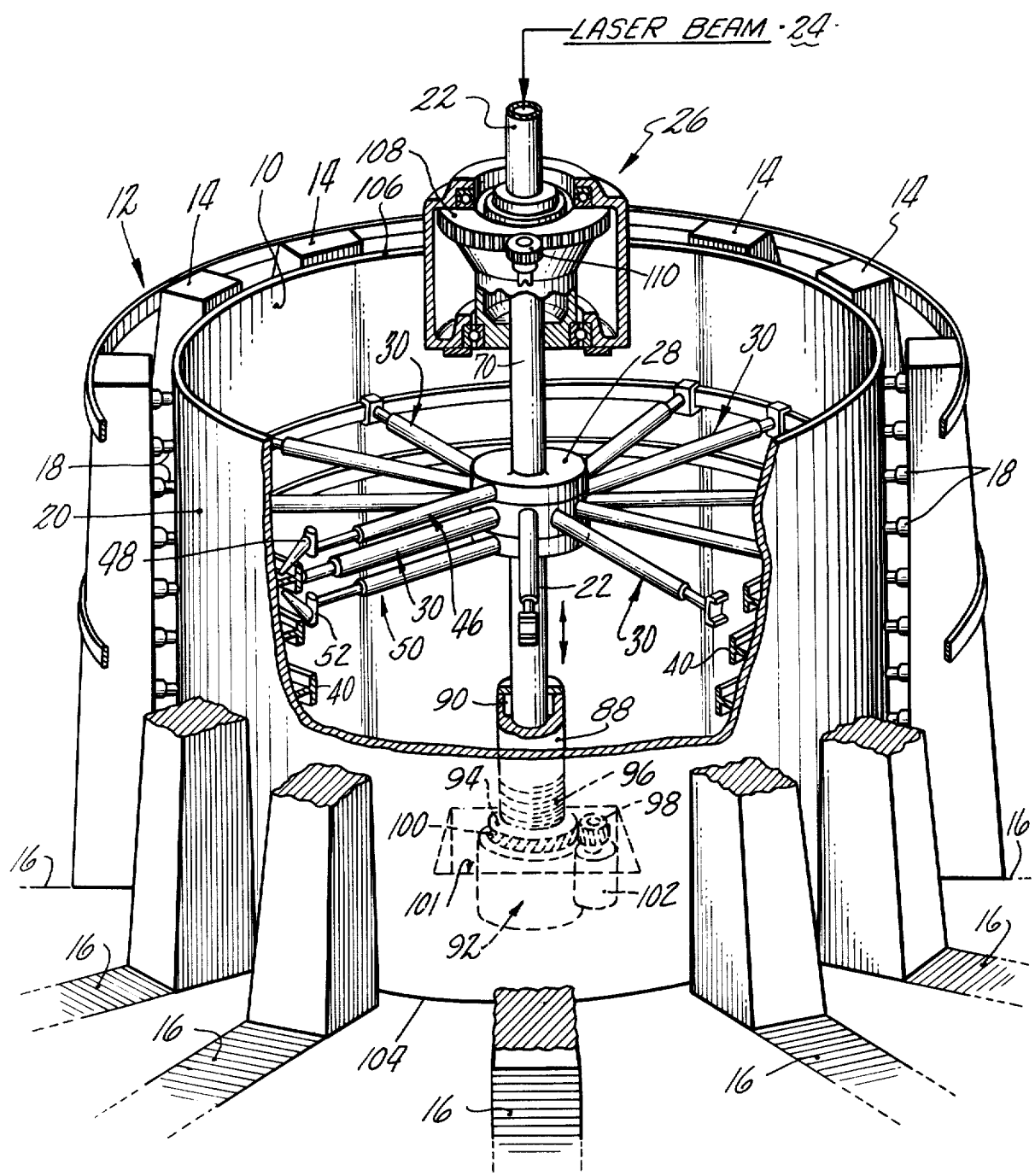
FIG. 1 is a simplified perspective view of the present invention showing the major components thereof.
Figure 2:
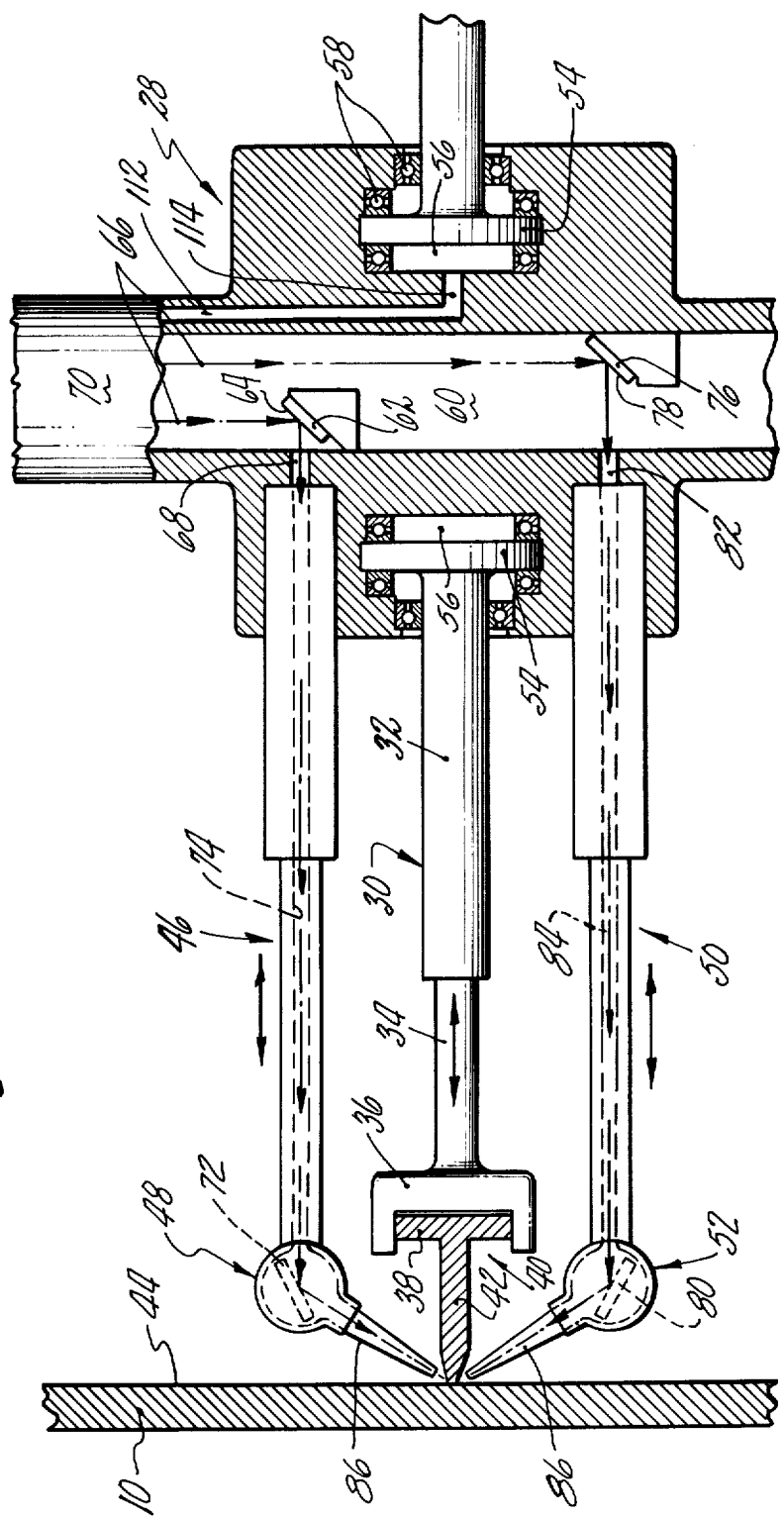
FIG. 2 is a simplified view of the rotatable housing shown in FIG. 1 adapted for securing T-frame stiffeners to the shell subassembly to fabricate a hull assembly.

Referring now to FIG. 1 wherein a shell subassembly 10 is symmetrically disposed within a support structure 12 consisting of a plurality of clamping columns 14 disposed in a spaced apart relationship circumferentially about the shell subassembly. The clamping columns are mounted on rails 16 adapted for radial movement of the clamping columns in the forward and reverse direction. Each of the clamping columns includes a plurality of actuators 18 disposed in spaced apart relationship along the length of the columns and adapted for pressing against an exterior surface 20 of the shell subassembly to provide rigidity to the subassembly during the welding process. The actuators are activated by hydraulic means or the like well known in the art. Centrally disposed within the curvilinear configuration defined by the support structure is a first shaft 22 adapted for rotation about a longitudinal axis 24 by a rotation drive 26 attached at the top portion of the shaft. A housing 28 fixedly attached to the shaft below the rotation drive and adapted for rotation therewith, as more fully shown in FIG. 2, has a plurality of rams 30, each having a first arm 32, circumferentially disposed in a spaced apart relationship within the central portion of the housing and radially extending therefrom and a second arm 34 movably engagable within a central bore (not shown) in the first arm for radial extension and contraction of the ram by means well known in the art such as hydraulic actuation, said second arm terminating in a C-shape clamp 36 adapted for securing a top portion 38 of a T-frame 40 and for pressing a web portion 42 of the T-frame against the inner surface 44 of the shell subassembly 10 forming a junction therebetween suitable for welding, a first telescopic arm 46 fixedly attached at one end to the top portion of the housing and having a first welding head 48 positioned on the other end and a second telescopic arm 50 fixedly attached at one end to the bottom portion of the housing and having a second welding head 52 positioned on the other end. The first and second welding heads are adapted for angular rotation by means well known in the art for aligning the welding heads with the junction of the T-frame and the interior surface 44 of the shell subassembly. The first and second telescopic arms 46, 50 are adapted by means well known in the art for moving the first and second welding heads radially toward and away from the interior surface 44 for properly aligning the welding heads on opposite sides of the T-frame to enable the welding heads to focus radiation onto the junction to obtain suitable welds.

The rams 30 each have a head 54 at the end of the first arm disposed within a cavity 56 circumferentially disposed within the housing and secured therein by bearings 58. The bearings support the head and a portion of the first arm and are adapted for allowing the housing 28 to rotate with the first shaft 22 about the longitudinal axis 24 while the rams remain in a stationary position.

The first shaft 22 has a central bore 60 extending therethrough with a first deflector 62 positioned therein having a reflection surface 64 adapted for intersecting and reflecting a portion of a beam of radiation 66 passing through the bore through a first aperture 68 within the wall 70 of the first shaft. The first deflector is optically aligned with a first focusing mirror 72 within the first welding head through a first passage 74 extending through the first telescopic arm 46, the top portion of the housing and the first aperture. A second deflector 76 axially displaced within the central bore from the first deflector has a reflection surface 78 adapted for reflecting that portion of the radiation 66 which passes the first deflector to a second focussing mirror 80 within the second welding head 52. The second deflector is optically aligned with the second focussing mirror through a second aperture 82 within the wall 70 and a second passage 84 extending through the bottom portion of the housing and the second telescopic arm 50. The first and second focussing mirrors have configurations well known in the art for focussing radiation through welding shields 86 onto the junction of the T-frame and the interior wall 44.

Referring again to FIG. 1, a second shaft 88 rotatably attached at one end by second bearings 90 to the bottom of the first shaft 22, said second bearings adapted for allowing the first shaft to freely rotate within the second shaft, is coupled to an elevator drive 92 adapted for raising or lowering the second shaft and the housing attached thereto via the first shaft by means well known in the art such as a ring gear 94 having interior helical threads (not shown) mated to helical threads 96 disposed in the exterior surface of the second shaft and a drive gear 98 mated to exterior teeth 100 on the ring gear. The drive gear is adapted for rotation by a suitable motor 102 such as a servomotor. The second bearings 90 are adapted for allowing the second shaft 88 to rotate during its ascension and descension while enabling the first shaft to remain stationary. The bearings also allow the first shaft to rotate while the second shaft remains stationary. The elevator drive is typically recessed below a horizontal plane through a bottom end 104 of the shell subassembly. The elevator drive, positioned within a recess 101 is adapted for lowering the end of the second shaft having the second bearings 90 below said horizontal plane sufficiently for welding T-frames in close proximity to the end 104 of the shell and for raising the second shaft to a height sufficient such that the rams 30 are capable of pressing T-frames to the interior wall 44 at a top end 106 of the shell subassembly.

The first shaft 22 is adapted for being decoupled from the second shaft to allow the use of a gantry (not shown) positioned above the shell subassembly to remove the first shaft and housing from the shell subassembly and to insert the first shaft and housing into the shell subassembly by means well known in the art. The rotation drive 26 includes a second ring gear 108 symmetrically disposed about the first shaft and fixedly attached thereto such that one complete rotation of the ring gear results in a complete rotation of the first shaft. A second drive gear 110 mated to the exterior teeth of the ring gear is adapted for rotation by a suitable motor (not shown).

Referring again to FIG. 2 wherein a fill hose 112 which extends along the first shaft is connected to a fill passage 114 within the housing for providing hydraulic fluid to the heads 54 of the rams for activating and deactivating the rams by means well known in the art. It is to be recognized that the fill hose may be connected to the housing at any convenient position which does not interfere with the rotation of the welding heads.

In operation a shell subassembly 10 which has been prefabricated is inserted between the clamping columns 14 by a gantry (not shown), or the like, positioned above the apparatus. The plurality of actuators 18 disposed along each of the clamping columns are energized by means well known in the art to apply radial pressure to the exterior surface of the shell subassembly to rigidly maintain the shell during the welding operation. The overhead gantry is then utilized for placing a T-frame circumferentially about the interior surface of the shell at a first location proximate the bottom end 104 of the shell subassembly. The housing 28, the first shaft 22 and the rotation drive 26 are then inserted into the shell subassembly, the C-shaped clamps 36 of the rams 30 are aligned with the top portion 38 of the T-frame and the ram is energized by hydraulic means or the like securing the C-shaped clamp about the top portion of the T-frame and pressing the web portion 42 against the inner surface 44 of the shell subassembly. The ram maintains the web portion against the interior surface to form a junction therebetween suitable for welding. Additionally the rams also maintain the axial position of the T-frame during the welding operation.

Once the T-frame has been positioned against the interior surface, the first and second welding heads 48, 52 respectively are aligned with the junction above and below the T-frame by extending the first and second telescopic arms 46, 50 to move the welding heads close to the junction and by rotation of the welding heads with means well known in the art to align the welding heads with the junction. Laser radiation from a source (not shown) exterior the apparatus is directed through the central bore 60 of the first shaft where a portion of radiation is interrupted and reflected by the first deflector 62 through a first passage 74 into the welding head where it is focussed by the first focussing mirror 72 onto the junction to form a Tee weld while the remaining portion of the radiation passes to the second deflector 76 and is directed through the second passage 84 into the second welding head 52 where the radiation is focussed by the second focussing mirror 80 onto the underside of the junction to form a Tee weld therein.

Each of the plurality of rams 30 has the head 54 disposed within the cavity 56 in the housing 28 and supported by bearings 58 adapted to allow the housing to rotate as the first shaft rotates while maintaining the rams, when pressing on the T-frames, in a stationary position. Once two-sided welding of the web portion of the T-frame to the shell has been initiated, the first shaft is rotated at a controlled rate by the rotation drive 26 such that the first and second welding heads simultaneously direct radiation onto the junction forming a continuous weld joint along the entire circumference of the T-frame as the welding heads traverse about the interior diameter of the shell subassembly. Filler material may be utilized in the formation of the Tee welds by means well known in the art.

After a T-frame has been welded about the entire circumference of the shell, the laser radiation is terminated, the rams are deactivated and withdrawn from the T-frame and the first and second welding heads are adjusted for movement past the top portion of the T-frame and are telescoped radially inward. The elevator drive 92 is then activated to raise the second shaft 88 a distance sufficient to align the rams with a second axial position along the inner surface of the shell and an additional T-frame is inserted into the interior of the shell and aligned with the second axial position on the interior surface by means well known in the art and the rams are activated such that the C-shaped clamp engages the top portion 38 of the T-frame and pushes the T-frame against the interior surface 44 forming a junction suitable for welding. The welding process as hereinbefore discussed is then repeated to weld the T-frame to the shell. This process is repeated for each row of T-frames until T-frames have been circumferentially welded to the shell surface along the entire length of the shell subassembly to form a completed hull section suitable for boat construction.

Once the T-frames have been welded into place, the housing 28, the first shaft 22 and the rotation drive 26 are removed from the hull assembly by the gantry, the second shaft is descended within the elevator drive 92 and the completed hull assembly is removed from the support structure by the gantry.

Alternatively, a portion of the clamping columns 14 may be adapted for being retracted below the surface such that the shell subassembly can be easily moved into or out of the enclosure formed by the support structure. Once the shell is radially enclosed by the columns, those columns retracted are raised to their proper height to provide support for the actuators to press against the exterior surface of the shell.

In one embodiment the clamping columns are located on rails 16 to enable the clamping columns to be utilized on shell subassemblies having a varying diameter and shape. It is to be recognized that the shell subassembly may be placed on a rotatable table adapted for rotating the shell section circumferentially about the first and second shafts. In this embodiment the first and second laser welding heads are stationary and the rams 30 rotate with the shell subassembly within the housing utilizing the bearings 46. It is also to be recognized that the support structure 12 may be formed of a continuous wall of concrete, or the like, for use in welding shell subassemblies having a uniform cross-sectional diameter.

It is to be recognized that the present invention is adapted for forming simultaneously top and bottom Tee weld joints at the junction of the T-frame with the interior surface to minimize thermal distortion of the metal and its detrimental effects. The simultaneous top and bottom welding of the T-frames significantly increases the speed at which the T-frame is welded to the shell subassembly. Since the welds are formed simultaneously above and below the T-frame and continuously in a single pass, the cleaning of the welded surface between passes, as required in the prior art, is eliminated. Additionally the top and bottom welding eliminates the requirement of first performing a downhand weld on one side of the T-frame and inverting the subassembly structure to perform a downhand weld on the second side of the T-frame.

Although this invention has been shown and described with respect to a preferred embodiment thereof, it should be understood by those skilled in the art that various changes and omissions in the form and detail thereof may be made therein without departing from the spirit and scope of the invention.

Having thus described a typical embodiment of our invention, that which we claim as new and desire to secure by Letters Patent of the United States is:

1. An apparatus for fabricating reinforced hull sections suitable for boat construction comprising:
   a support structure adapted for circumferentially enclosing a shell subassembly and radially pressing against an exterior surface of said subassembly for constraining motion of the shell subassembly in a radial direction;
   interior ram means adapted for radially pressing T-frames disposed circumferentially about an interior surface of the shell subassembly at a preselected axial position against an interior surface of said subassembly forming a junction therebetween suitable for Tee welding and for maintaining the circumferential axial position of the T-frame during welding;
   means for focussing radiation onto the junction for welding the T-frame to the shell subassembly;
   means for rotating the means for focussing radiation about a longitudinal axis of the shell subassembly for circumferentially moving the radiation along the junction to circumferentially weld the T-frame to the shell subassembly;
   means for axially positioning the interior ram means and the means for focussing radiation at selected positions along the longitudinal axis within the shell subassembly; and
   means for directing radiation from a laser capable of providing radiation suitable for welding to the means for focussing the radiation.

2. The invention in accordance with claim 1 wherein the support structure is a plurality of columns circumferentially disposed in a spaced apart relationship.

3. The invention in accordance with claim 2 further including actuator means axially disposed along the length of each column for providing radial pressure against the exterior surface of the shell subassembly for maintaining rigidly the shell subassembly during welding.

4. The invention in accordance with claim 2 further including means for radially moving the columns to enclose shell subassemblies having varying diameters and curvilinear configurations.

5. The invention in accordance with claim 1 wherein the means for rotating the means for focussing radiation includes;
   a first shaft adapted for being inserted into the central portion of the shell subassembly along the longitudinal axis and for removal therefrom by gantry means disposed above the support structure;
   a housing circumferentially disposed about the first shaft and fixedly attached thereto adapted for fixedly securing the means for focussing the radiation thereto wherein the housing and the means for focussing radiation are adapted for rotation about the longitudinal axis with the first shaft; and
   a rotation drive attached to the first shaft adapted for rotating the first shaft about the longitudinal axis.

6. The invention in accordance with claim 5 wherein the means for focussing radiation includes:
   a first welding head adapted for focusing radiation onto one side of the junction of the T-frame and the interior surface;
   a first telescopic arm extending radially from the housing toward the interior surface of the shell subassembly having a first end fixedly attached to a top portion of the housing and a second end attached to the first welding head wherein the first telescopic arm is adapted for adjusting the separation between the first welding head and the interior surface of the shell subassembly;
   a second welding head adapted for focussing radiation onto the other side of the junction; and
   a second telescopic arm extending radially from the housing toward the interior surface of the shell subassembly having a first end fixedly attached to a bottom portion of the housing and a second end attached to the second welding head wherein the second telescopic arm is adapted for adjusting the separation between the second welding head and the interior surface of the shell subassembly.

7. The invention in accordance with claim 5 wherein the interior ram means is a plurality of rams disposed in a circumferentially spaced apart relationship about the housing and extending radially from the housing toward the interior surface of the shell subassembly wherein each ram includes:
   a first arm having a head attached at one end, said head movably engaged within a cavity circumferentially disposed within a central portion of the housing and adapted for remaining stationary as the housing rotates about the longitudinal axis;
   a second arm adapted for movable engagement within a central bore within the first arm for radial extension and contraction of the ram; and
   a clamp attached to an end of the second arm adapted for pressing T-frames radially against the interior surface of the shell subassembly forming junctions therebetween suitable for Tee welding and for maintaining the position of the T-frame during welding.

8. The invention in accordance with claim 7 further including means for activating the rams to press against the T-frames.

9. The invention in accordance with claim 5 wherein the means for axially positioning the interior ram means and the means for focussing radiation includes:
   a second shaft having a first end adapted for rotatable attachment to the bottom of the first shaft below the housing wherein the first shaft is capable of rotating about the longitudinal axis within the end of the second shaft while the second shaft remains stationary; and
   an elevator drive adapted for raising or lowering the second shaft thereby raising or lowering the housing for aligning the interior ram means and the means for focussing the radiation with selected axial positions along the interior surface of the shell subassembly.

10. The invention in accordance with claim 9 wherein the elevator drive is recessed below a horizontal plane through the bottom end of the shell subassembly to allow the subassembly to be moved into or out of the support structure.

11. The invention in accordance with claim 2 wherein a portion of the columns are adapted for movement whereby the support structure has a side opening capable of passing a shell subassembly.

12. The invention in accordance with claim 6 wherein the first and second telescopic arms are positioned in the housing in a vertical spaced apart relationship for enabling the first and second welding heads to simultaneously focus radiation to both sides of the junction at a radial position.

13. The invention in accordance with claim 6 wherein the means for directing radiation to the means for focussing radiation includes:
- a first passage extending from an aperture in a side wall of the first shaft through the top portion of the housing and through the first telescopic arm to the first welding head;
- a second passage extending from a second aperture within the side wall of the first shaft through the bottom portion of the housing and through the second telescopic arm to the second welding head;
- a first deflector, disposed within a central bore within the first shaft having a reflective surface in line-of-sight communication with the first welding head through the first passage, adapted for intercepting a portion of a beam of radiation passing through the central bore and reflecting the intercepted radiation through the first passage to the first welding head; and
- a second deflector, disposed within the central bore of the first shaft having a reflective surface in line-of-sight communication with the second welding head through the second passage, adapted for intercepting a portion of the radiation passing the first deflector and reflecting the intercepted radiation through the second passage to the second welding head.

14. A method for fabricating reinforced hull sections suitable for boat construction comprising:
- circumferentially enclosing a shell subassembly with a support structure adapted for radially pressing against an exterior surface of the subassembly for constraining motion of the shell subassembly in a radial direction;
- inserting T-frames into the interior of the shell subassembly;
- positioning the T-frames circumferentially about an interior surface of the shell subassembly at a preselected axial position;
- inserting ram means and means for focussing radiation for welding the T-frames to the interior surface into the interior of the shell subassembly;
- aligning the ram means with the axial position of the T-frames;
- activating the ram means wherein clamps of the ram means engage the T-frames and press the T-frames against the interior surface of the shell subassembly for providing a junction therebetween suitable for Tee welding and for maintaining the axial position of the T-frames;
- aligning the means for focussing radiation with the junction wherein a first welding head is aligned with one side of the junction for providing radiation to that side of the junction at a particular radial position and a second welding head is aligned with a second side of the junction for simultaneously providing radiation to the second side of the junction at the same radial position;
- providing radiation simultaneously to the first and second welding heads to Tee weld the T-frame to the interior surface;
- rotating the welding heads while providing radiation thereto to circumferentially Tee weld the T-frames to the interior surface;
- deactivating the ram means pressing against the T-frames wherein the clamps release the T-frames and move radially inward to allow axial movement of the clamps past the T-frames welded to the interior surface; and
- moving the welding heads radially away from the junction to allow axial movement of the welding heads past the T-frames welded to the interior surface.

15. The invention in accordance with claim 13 further including providing filler material to the junction while providing radiation thereto to form Tee welds.

* * * * *